United States Patent [19]
Jan

[11] Patent Number: 6,000,169
[45] Date of Patent: Dec. 14, 1999

[54] MOLE CHASER

[76] Inventor: Te-Chin Jan, 24 F-1, No. 161, SungTeh Rd., Taipei, Taiwan

[21] Appl. No.: 08/964,981

[22] Filed: Nov. 5, 1997

[51] Int. Cl.⁶ .................................................. A01M 1/20
[52] U.S. Cl. ............................................................... 43/124
[58] Field of Search ............................... 43/124; 367/139; 116/22 A; 340/384.7

[56] References Cited

U.S. PATENT DOCUMENTS

| | | | |
|---|---|---|---|
| 4,215,429 | 7/1980 | Riach | 367/139 |
| 4,366,562 | 12/1982 | McGinty | 43/124 |
| 4,943,953 | 7/1990 | Kafi | 367/139 |
| 5,205,066 | 4/1993 | Jan | 43/124 |
| 5,224,438 | 7/1993 | Buss | 43/124 |
| 5,241,777 | 9/1993 | Looker | 43/124 |
| 5,822,917 | 10/1998 | Jan | 43/124 |
| 5,832,657 | 11/1998 | Jan | 43/124 |

*Primary Examiner*—Kurt Rowan
*Attorney, Agent, or Firm*—W. Wayne Liauh

[57] ABSTRACT

An improvement for mole chaser includes a stem houses a motor to drive a rotary means within a hollow impact unit. The impact unit has a plural number of curved bulges located therein. The rotary unit has movable impact members eccentrically located thereon. Motor rotation will drive the impact members hitting the bulges because of centrifugal force and cause the stem to produce strong vibration and audio frequency to scare away the moles. The eccentric impact member may hit the bulges and bounce back without damage.

5 Claims, 5 Drawing Sheets

MOLE CHASER

BACKGROUND OF THE INVENTION

1. Field of the Invention

This invention relates to an improvement for a mole chaser and particularly to a mole chaser which employs a motor to drive a rotation member for producing impact force to generate vibration and audio frequency to scare away moles.

2. Description of the Prior Art

Conventional mole chaser such as the one disclosed under U.S. Pat. No. 5,205,066 (as shown in FIG. 1) includes an audio frequency circuit to produce the desired function. According to the circuitry shown in FIG. 1, the power supply passes RI to charge PIN 7 of IC 555 in a cyclic and periodic manner; the charging and discharging coefficient are about in a ratio of 1:7. The power passes D2 to supply the PIN 6 of IC 555 to generate an oscillation which is coupled with C2 to generate a charging and discharging cycle of 1–2 seconds. C2 charges PIN 7 through R2 and D1 to provide a triggering level. When a comparative level is reached, PIN 2 will make a reset. An output of driving voltage will be generated on PIN 3 to drive a buzzer 3406 to generate an audio vibration at a frequency ranging from 300 to 400 HZ on a main stem 10 so as to provide a chaser effect to moles. As the audio frequency is generated by the vibration of the main stem driven indirectly through the buzzer, the intensity will diminish during transmission. The mole chasing effect is limited to small range and is not effective.

SUMMARY OF THE INVENTION

In view of aforesaid disadvantages, it is therefore an object of this invention to provide a mole chaser which uses a mechanical means to produce vibration so that a much stronger audio frequency can be generated than through using a buzzer. It hence can provide better mole chasing effect.

According to this invention, the mechanical means includes an impact member which may be rotated eccentrically to hit a stationary member housed in the stem because of centrifugal force, and thus results in strong vibration on the stem. A strong audio frequency then may be generated to produce much better mole chasing effect.

BRIEF DESCRIPTION OF THE DRAWINGS

The invention, as well as its many advantages, may be further understood by the followings detailed description and drawings in which.

DETAILED DESCRIPTION OF THE PREFERRED EMBODIMENT

Figure 2:
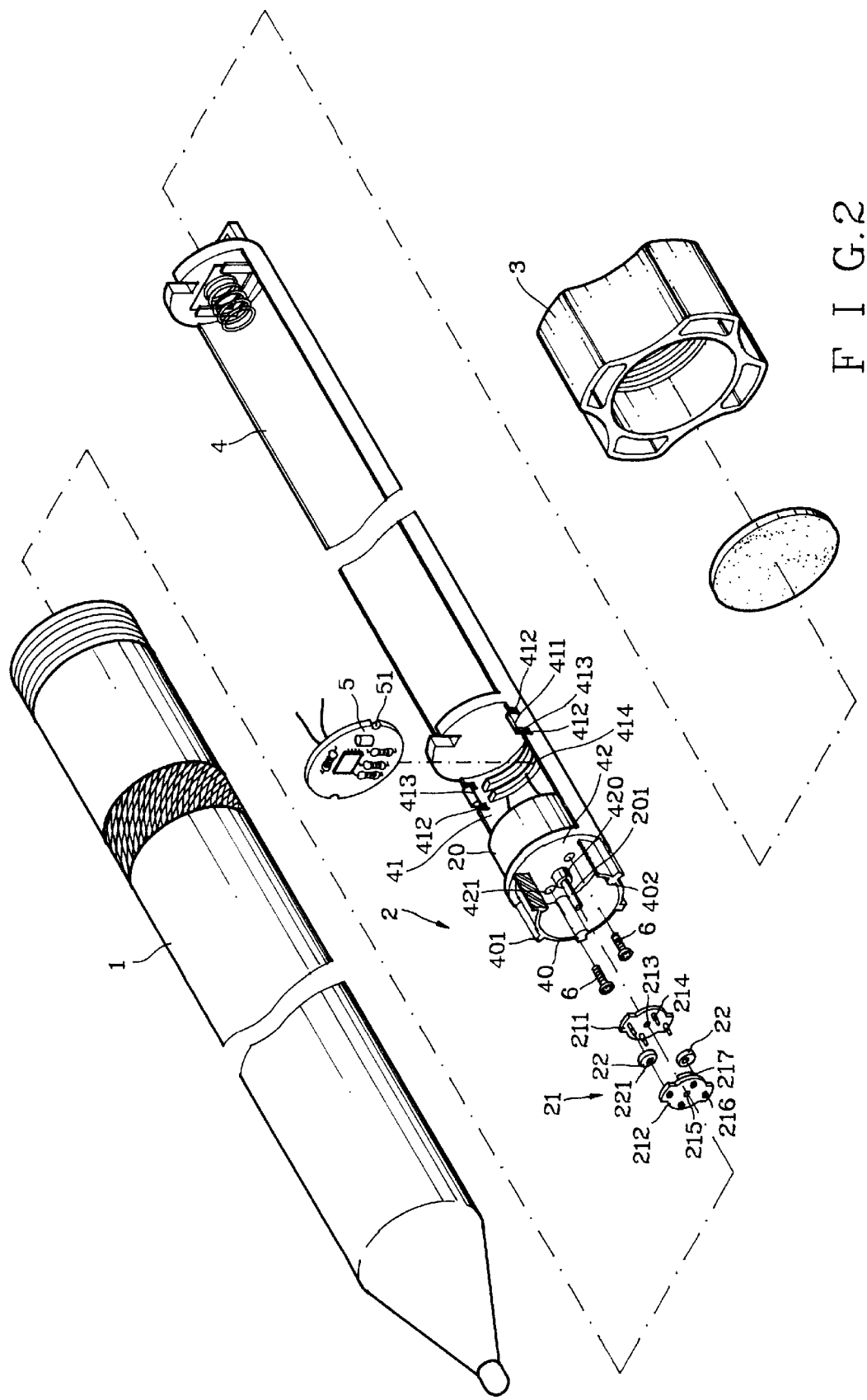
FIG. 2 is an exploded view of this invention.
Figure 3:
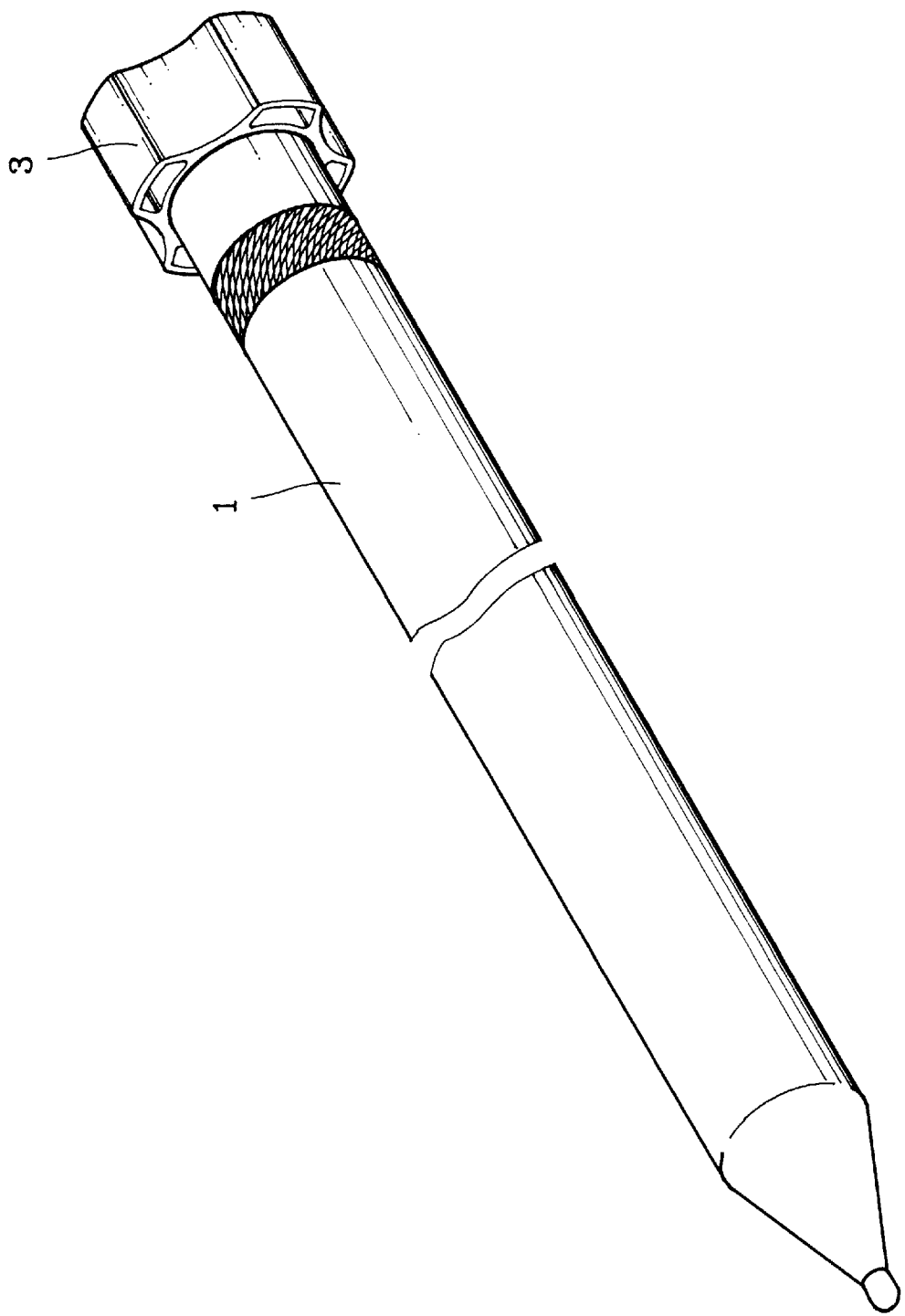
FIG. 3 is a pictorial view of this invention.
Figure 4:
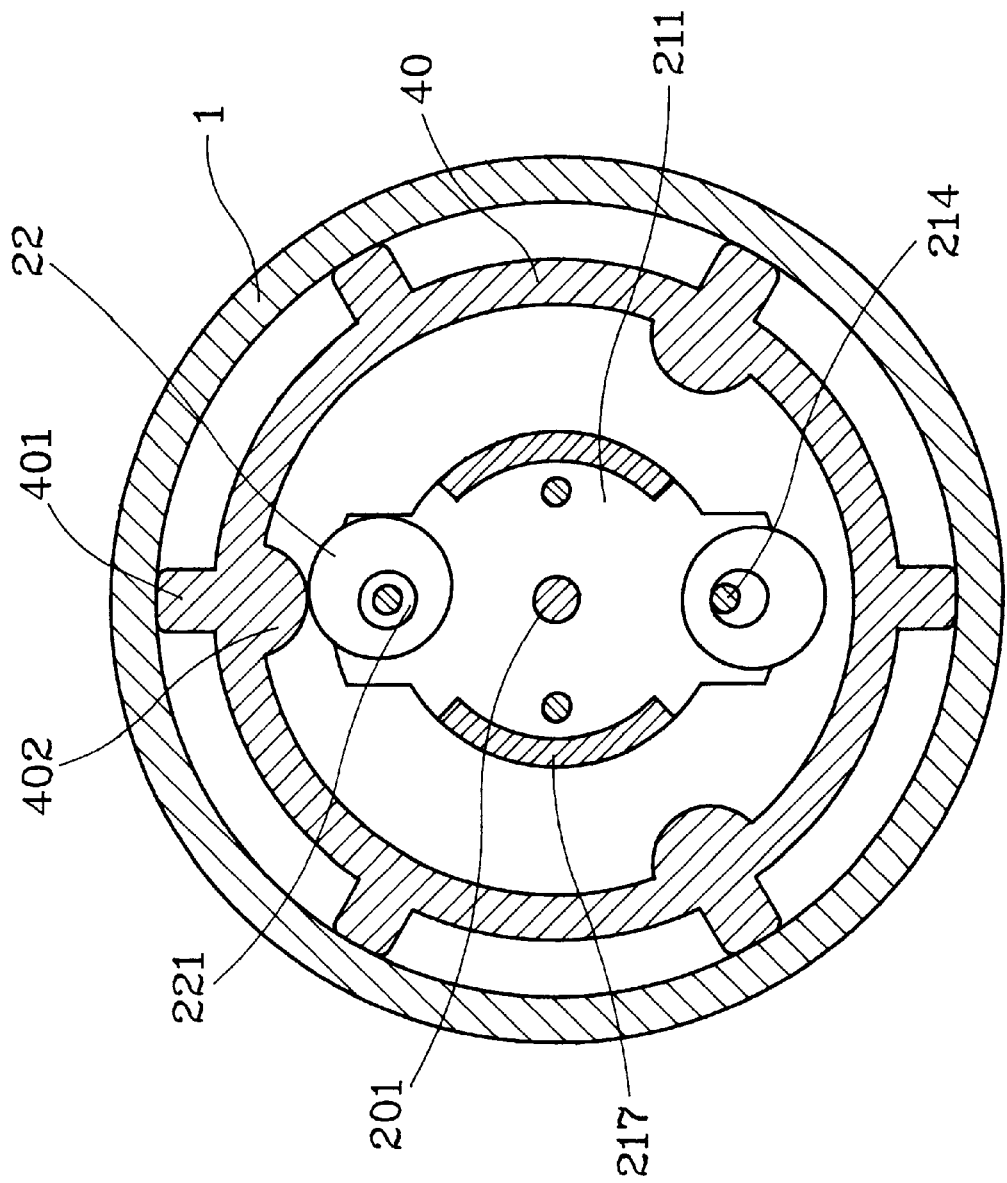
FIG. 4 is a cross-section view of a rotary means of this invention.

Referring to FIGS. 2 and 4, this invention includes a stem 1, a rotary means 2, a cap 3, a battery chamber 4 and a control circuit 5. The stem 1 and cap 3 are structured like a conventional mole chaser for housing all other components and form no part of this invention. Their structural details thus will be omitted.

In front of the battery chamber 4, there is an open trough 41 and a hollow impact unit 40 which has a plural number of ridges 401 formed on the outside perimeter and a plural number of curved bulges 402 formed on the inside perimeter thereof. The impact unit 40 is housed in the stem 1 with the outside surface of the ridges 401 making contact with the inside surface of the stem. There is a separating wall 42 between the trough 41 and the impact unit 40. In the separating wall 42, there is a first spindle hole 420 in the center and two apertures 421 spaced from the spindle hole 420. On each of the two lateral walls 411 of the trough 41, there are a pair of spaced slots 412. Between each pair of slots 412 there is a lug 413 formed on the lateral wall 411 projecting toward the center. On the inside bottom wall of the trough 41 and at the positions against the slots 412, there are a pair of spaced bottom ridges 414 formed thereon.

The control circuit 5 formed in substantially a circular shape has two lateral notches 51 engageable with the lugs 413 when the control circuit 5 is placed in the trough 41 with the bottom edge of the control circuit 5 sandwiched between the two bottom ridges 414. The control circuit 5 thus may be held securely in the trough 41.

The rotary means 2 includes a motor 20, a rotary block 21 and a pair of impact members 22. The motor 20 is located at a front end of the trough 41 and is fixed to the separating wall 42 by means of screws 6 through the apertures 421. A motor spindle 201 runs through the first spindle hole 420 and engages firmly with the rotary block 21 which will be depicted below.

The rotary block 21 includes a base 211 and a cover 212. The base 211 has a second spindle hole 213 in the center and a plural number of struts 214. Each strut 214 has a taper top end. The cover 212 has a third spindle hole 215 in the center and a plural number of apertures 216 mating and engageable with the top ends of the struts 214. The cover 212 further has two spaced reinforced flanges 217 on two lateral sides.

Each impact member 22 is shaped in a circular disk with an eccentric opening 221 which has a larger diameter than the diameter of the strut 214. The impact member 22 is hung on the strut 214. The cover 212 is then engaged with the base 211 until the flanges 217 contact the base surface. The second and third spindle holes 213 and 215 are firmly engaged with the motor spindle 201.

FIG. 4 shows this invention in use. When the control circuit 5 activates the motor 20, the rotating motor spindle 201 drives the rotary block 21 to rotate. Because of centrifugal force, the impact member 22 will be moved radially outward from the strut 214 and hit the bulges 402 during rotation. As the eccentric opening 221 has a large diameter than the strut 214, and the bulge 402 has a curved surface, the impact member 22 will be bounced back without damage. The impact force and vibration will be transmitted to the stem 1 via the ridges 401. A great vibration and strong audio frequency thus will be generated to scare away the moles.

Figure 1:
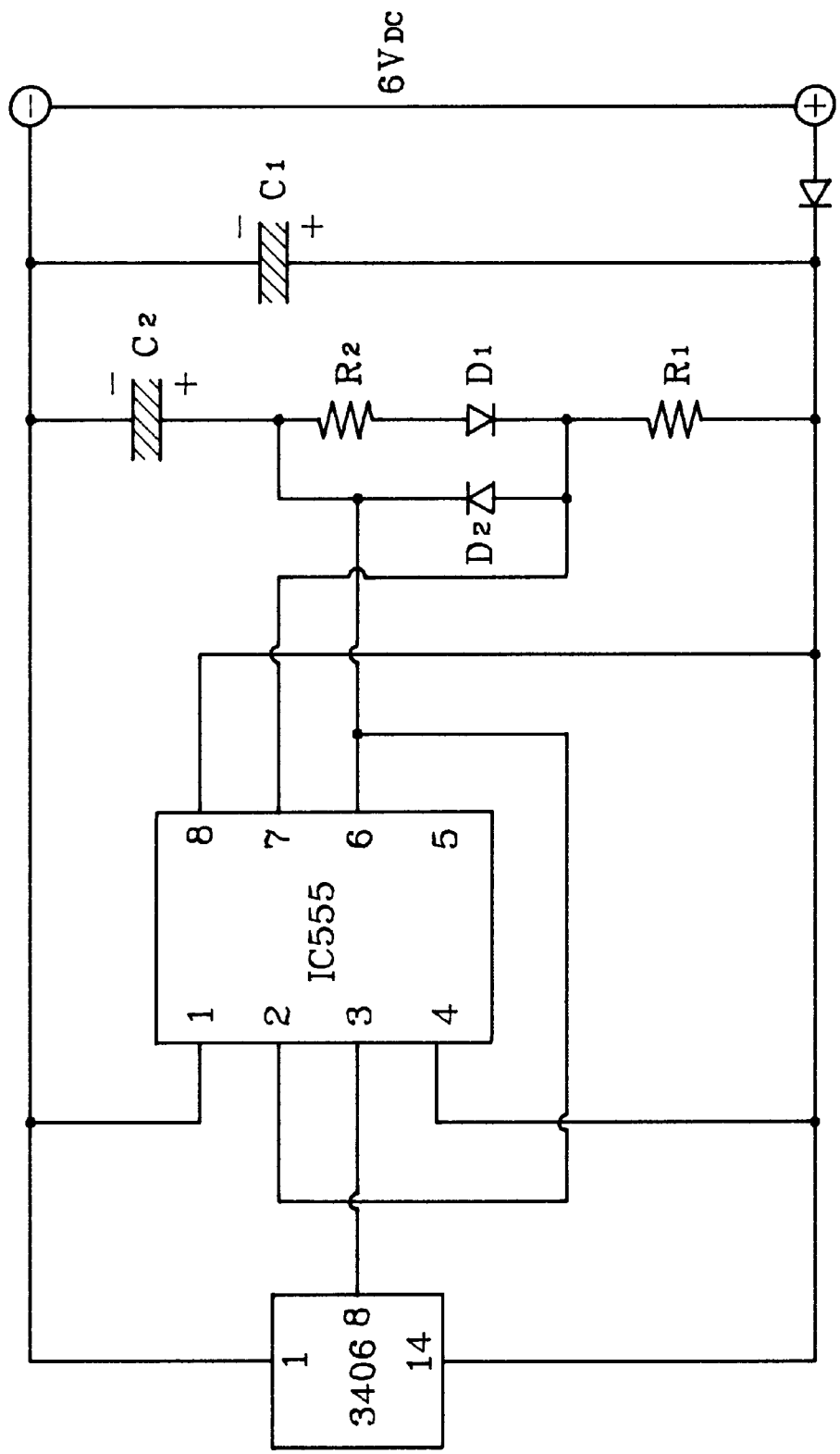
FIG. 1 is a circuitry diagram of a conventional mole chaser.
Figure 5:
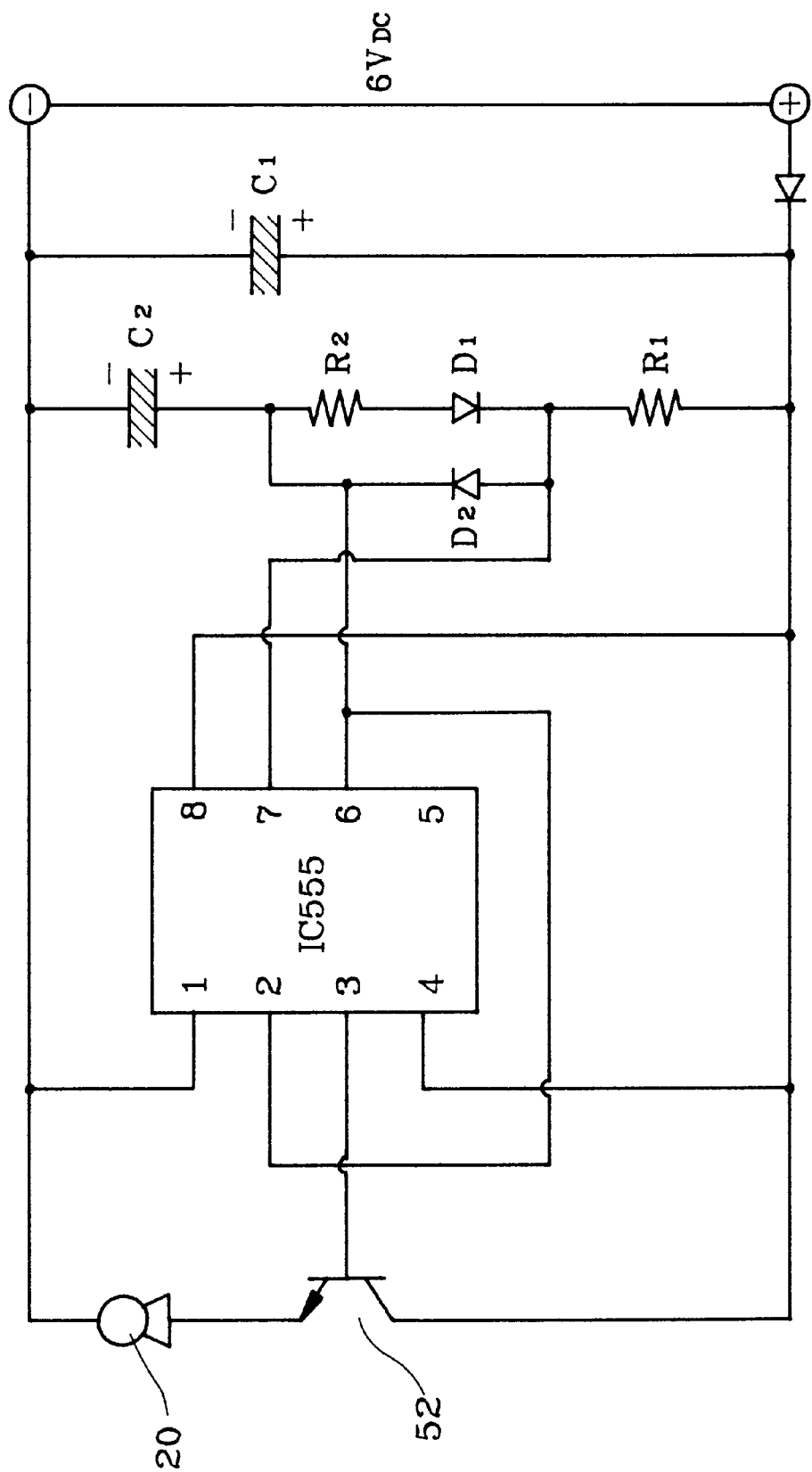
FIG. 5 is a circuitry diagram of this invention.

FIG. 5 illustrates an electric circuit used in this invention. It is generally like the one used in a conventional mole chaser except that a transistor 52 is employed to amplify the output voltage from PIN3 of the IC 555 for driving the motor 20 rather than for activating a buzzer 3406 shown in FIG. 1.

It may thus be seen that the objects of the present invention set forth herein, as well as those made apparent from the foregoing description, are efficiently attained. While the preferred embodiment of the invention has been set forth for purpose of disclosure, modifications of the disclosed embodiment of the invention as well as other embodiments thereof may occur to those skilled in the art.

Accordingly, the appended claims are intended to cover all embodiments which do not depart from the spirit and scope of the invention.

It thus can be seen, this invention uses a mechanical vibration means to actuate the main stem directly for generating the audio vibration frequency instead of employing electronic parts to generate audio frequency and then to actuate the main stem for producing sonic vibration indirectly. Through this invention, a stronger vibration and audio frequency will be generated on the main stem to make mole chasing more effective.

I claim:

1. An improvement for a mole chaser, comprising:

a stem formed by a hollow tube, a cap engageable with one end of the stem;

a trough connected to a battery chamber located in the stem;

a control circuit in circular shape located in the trough in front of the battery chamber and sandwiched between a pair of spaced bottom ridges formed on a bottom of the trough;

a hollow impact unit located in front of the trough having a plural number of ridges on an outside surface thereof in contact with an inside surface of the stem and a plural number of curved bulges formed on the inside surface thereof;

a separating wall located between the trough and the impact unit; and a rotary means including a motor screwed to the separating wall and a rotary block engaged with a motor spindle having an impact member located thereon;

wherein the control circuit activates the motor and the rotary block to rotate which results in the impact member hitting the curved bulges for generating vibration on the stem to produce audio frequency to scare away moles.

2. An improvement for a mole chaser of claim 1, wherein the trough has a pair of spaced slots on each of two lateral walls with a lug between each pair of slots, the control circuit having two lateral notches engageable with the lugs for holding the control circuit securely.

3. An improvement for a mole chaser of claim 1, wherein the rotary means includes a base having a second spindle hole in the center and a plural number of struts spaced from the second spindle hole, and a cover having a third spindle hole in the center, a plural number of apertures spaced from the third spindle hole and engageable with the struts, and two spaced reinforced lateral flanges;

the impact member hanging on the strut through an opening which has a larger diameter than the strut;

wherein the cover and the base are engaged together and fixed to the motor spindle through the second and third spindle holes.

4. An improvement for a mole chaser of claim 3, wherein the strut has a tapered top end.

5. An improvement for a mole chaser of claim 3, wherein the opening in the impact member is located eccentrically.

* * * * *